United States Patent Office 3,402,187
Patented Sept. 17, 1968

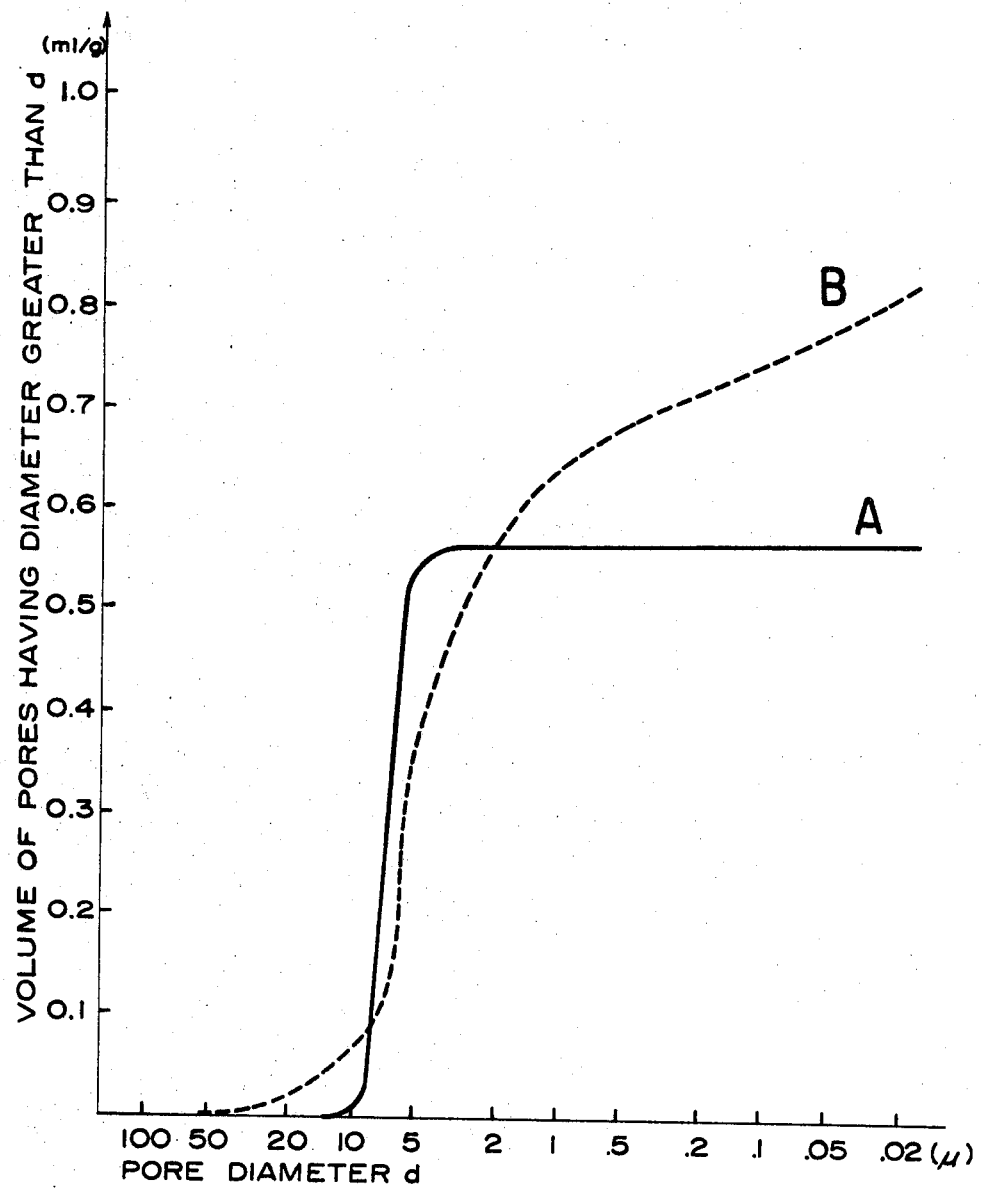

3,402,187
PROCESS FOR THE PREPARATION OF NAPHTHOQUINONE BY CATALYTIC GAS-PHASE OXIDATION
Anton Kaiser, Basel, and Willy Regenass, Neuallschwil, Switzerland, assignors to Ciba Limited, Basel, Switzerland, a Swiss company
Filed Feb. 26, 1964, Ser. No. 347,425
Claims priority, application Switzerland, Mar. 7, 1963, 2,882/63
8 Claims. (Cl. 260—396)

ABSTRACT OF THE DISCLOSURE

A process for manufacturing naphthoquinone is provided in which naphthalene is oxidized by conducting it at a temperature of 300–500° C. together with a gas containing free oxygen over a solid bed catalyst whose active catalyst mass is formed by roasting at 250–600° C., a mixture comprised of vanadium pentoxide or a mixture of vanadium pentoxide with other metal oxides, an alkali metal sulfate and an alkali metal pyrosulfate. The catalyst is further characterized by having an inert support for the active catalyst components and having pores of which up to about 95% have a diameter within the range of 0.2 to 50µ.

It is known that naphthalene can be oxidised in the gas phase to yield naphthoquinone and phthalic anhydride with the aid of vanadium pentoxide deposited on silicic acid as catalyst. In this process there is as a rule no difficulty involved in manufacturing substantial proportions of phthalic anhydride and minor proportions of naphthoquinone. On the other hand, the manufacture of napthoquinone in a proportion exceeding that of the phthalic anhydride formed is very difficult; this is due to the fact that the primarily formed naphthoquinone is easily transformed into phthalic anhydride. The hitherto tried gas phase oxidations leading to naphthoquinone are as a rule fluid bed processes and numerous attempts have been made to arrive at a maximum yield of naphthoquinone by a suitable choice of the reaction conditions, such for example as composition of the catalysts, time of contact, throughput and temperature; cf. U.S. specifications Nos. 2,765,323, 2,809,939, 2,863,884 and 3,038,911.

Notwithstanding the numerous expedients tried, the fluid bed process always yields more phthalic anhydride than naphthoquinone.

It has further been attempted to arrive at a satisfactory solution with the solid bed process instead of with the fluid bed process, and it has been proposed in this connection to use tin dioxide instead of silicic acid as catalyst support; cf. U.S. Patent No. 3,095,430, granted June 25, 1963, to Walter Wettstein. However, it was observed that tin dioxide is not a perfectly inert vehicle when used in solid bed catalysts. When the batch is slightly overheated, tin dioxide reacts with the catalyst mass and impairs the mechanical strength of the catalyst, and as a result the yield of naphthoquinone drops.

Although in the first two U.S. specifications mentioned above it has been stated that the known fluid bed catalysts were unsuccessfully tried as solid bed catalysts, it has now been found that certain solid bed catalysts give excellent yields of naphthoquinone. This result is obtained when the active catalyst dispersed on an inert vehicle is in the molten state under the working conditions and a preponderant share of the pores has a diameter of over 0.2µ.

The present invention provides a process for the manufacture of 1,4-naphthoquinone by passing a mixture of naphthalene and an oxygen-containing gas under atmospheric pressure and at a temperature within the range from 300 to 500° C. over a catalyst which is disposed in a solid bed and whose active catalyst mass is composed of vanadium pentoxide or alternatively of a mixture thereof with a further metal oxide, of an alkali metal sulfate and alkali metal pyrosulfate, or alternatively wholly or partially of the corresponding thallium salts. The said catalyst mass is obtained by roasting the starting materials on an inert support. According to the present process the gas mixture containing naphthalene is conducted over a shaped catalyst which has pores of which up to about 95% have a diameter within the range from 0.2 to 50µ and which has been formed by the melting of the active catalyst mass on its being roasted at a temperature within the range from 250 to 600° C. so that the melt forms an even coating on the inert support material.

After the catalyst of the invention has cooled off, the diameter of its pores is almost entirely within the range from 0.2 to 50µ, principally from 1 to 10µ, that is to stay that about 95% of the pore volume has this diameter. Only a small share of the pores, that is to say less than about 2%, has a diameter of less than 0.2µ. Catalysts that form phthalic anhydride predominantly contain substantial shares of pores having a diameter from about 0.005 to 0.025µ.

The active catalyst mass must be of such a nature that it passes into the molten state at a roasting temperature from 250 to 600° C., preferably at a temperature below 500° C., and then evenly covers the support material. When the mass melts at a temperature above 600° C., a catalyst mass is obtained which has almost completely coarse pores (pore radius greater than 1µ) but is of insufficiently selectivity insofar as the formation of naphthoquinone is concerned. Two conditions must be fulfilled to ensure that the melting essential for the selective naphthoquinone formation takes place at a temperature within the range of 250 to 600° C. and continues at the reaction temperature, namely:

(1) The initially separate ingredients of the active catalyst mass must be converted by suitable steps, before roasting, into such an intimate and cohesive state that within the indicated temperature range the flowing catalyst particles form a continuous coating on the inert vehicle.

(2) The active catalyst mass must be composed so that it melts at the roasting temperature.

The conversion of the ingredients of the active catalyst mass into a cohesive and intimate state, that is to say a state in which considerable forces of cohesion exist, can be performed in a variety of ways. For example, the pulverulent mixture of the active catalyst mass and the inert support material can be shaped by moulding; in this connection it of decisive importance to use a moulding pressure capable of producing the necessary cohesion in the finished mouldings. When the pulverulent mixture is pressed into tablets, the tablets must be capable of withstanding a pressure of at least 3 to 4 kg. (measured with a Stokes hardness tester), since otherwise the mass does not melt. According to another method the active catalyst mass and the support material are pasted together, for example with water, an alcohol or preferably with sulfuric acid, whereby an intimate contact between the active constituents is ensured. The pasty mass can be shaped, for example by spraying, extrusion moulding or granulating, and then subjected to the roasting process. Alternatively, the requisite cohesion can be achieved by melting the pulverulent ingredients of the active catalyst mass without the inert support material, cooling, powdering it, then mixing it with the support material, making the whole into the form of tablets which are finally roasted.

In all cases it is easy to determine whether melting has taken place by simply observing the change of color during roasting. A greenish yellow color of the catalyst indicates that it has melted, while a redish yellow catalyst has not undergone melting. The shaped catalysts, to be used in solid bed processes according to the invention, have preferably a grain size ranging from 2 to 20 mm.

The second condition, namely the presence of an active catalyst mass capable of melting below 600° C., presupposes the use of an alkali metal pyrosulfate, or of an alkali metal bisulfate which under the conditions mentioned is transformed into an alkali metal pyrosulfate. Potassium bisulfate is especially suitable for this purpose. The active catalyst mass contains further an alkali sulfate having a stabilizing action, above all potassium sulfate. The alkali metal sulfate and pyrosulfate may be replaced wholly or partially by thallium sulfate and pyrosulfate respectively. If desired, the potassium bisulfate may be formed in situ from potassium sulfate and ammonium sulfate or sulfuric acid.

The vanadium pentoxide is preferably obtained by using ammonium metavanadate. If desired, other metal oxides may be used additionally, for example the oxides of cesium, aluminum, titanium, zirconium, hafnium, tantalum, niobium, chromium, molybdenum, tungsten, manganese, cobalt, nickel, silver, zinc, mercury or lead. The proportion of such additions is as a rule no more than 50% referred to the vanadium pentoxide used. Preferred use is made of the oxides of aluminum, zirconium, tungsten and especially molybdenum.

As inert support material there may be used quite generally any material that is inert towards the catalyst under the specified roasting and reaction conditions. A preferred material is silicic acid, for example in the form of kieselguhr, or the product obtained by treating an alkali or alkaline earth metal silicate with an acid. Instead of silicic acid there may be used, for example, silicon carbide.

Particularly advantageous active catalyst masses contain 3 to 40%, preferably 10 to 30%, by weight of vanadium pentoxide, if desired in admixture with another metal oxide, 20 to 60%, preferably 30 to 50%, by weight of alkali metal sulfate, especially potassium sulfate, and 20 to 60%, preferably 30 to 50%, by weight of pyrosulfate, preferably potassium bisulfate that is transformed into a pyrosulfate. The ratio of inert support to active catalyst mass may vary within wide limits and depends predominantly on the specific surface of the vehicle. Its upper limits is set by the demand that the active mass must envelop the vehicle and its lower limit by the demand that the catalyst must have adequate mechanical strength. As a rule, 50 to 500%, preferably 100 to 300%, by weight of support material, referred to the metal oxide, are used.

The roasting temperature at which melting must occur varies from 250 to 600°, preferably from 350° to 450° C., and the reaction temperature from 300 to 550°, preferably from 350° to 450° C. To adjust the pore size, organic materials, for example naphthalene, oxalic acid or urea, may be added to the mass before it is roasted.

The air+naphthalene mixture is so adjusted that it contains 0.2 to 10%, preferably 0.5 to 5%, by volume of naphthalene. The throughput, represented by the time factor $W/F$ (where $W$ is the weight of the catalyst in grams and $F$ is the amount of naphthalene in gram/second) amounts to $10 \cdot 10^3$ to $100 \cdot 10^3$, preferably $20 \cdot 10^3$ to $50 \cdot 10^3$.

The pore size distribution graphs (see FIGURE 1) of the accompanying drawings reveal the relationship between specific pore volume (ml./g. of catalyst) and pore diameter; they are plotted by the Ritter and Drake method (see L. C. Drake and H. L. Ritter, Ind. Eng. Chem. 17 [145], Analyt. Ed. pages 782–791).

Graph A in FIGURE 1 represents the distribution of the pore volumes of a catalyst in which the catalyst mass has been applied by melting according to the invention, whereas graph B represents the pore volumes of a similarly constituted catalyst, except that in its preparation its active catalyst mass has not melted. In the case of graph A over 95% of the pores have a diameter ranging from 5 to 10$\mu$. In the case of graph B a substantial share of the pores, namely about 20%, has a pore diameter of less than 1$\mu$ and about 10% have a pore diameter of less than 0.2$\mu$. This conforms well with the surface measurements according to BET (Brunauer, Emmet and Teller); for the new catalysts of type A surfaces of less than 0.2 m.$^2$/g. were found, while catalysts of the B type had surfaces of 1.2 m.$^2$/g. By comparing the respective selectivity of catalysts A and B, the folowing yields of naphthoquinone and phthalic anhydride in grams, referred to 100 g. of naphthalene converted, are obtained under identical reaction conditions:

|  | Naphthoquinone | Phthalic anhydride |
| --- | --- | --- |
| Catalyst type A | 70 | 48 |
| Catalyst type B | 12 | 98 |

Example 1

100 g. of synthetic, commercial calcium silicate are suspended in 800 ml. of water, 275 ml. of 38% hydrochloric acid are added in small portions, and the whole is stirred for 1 hour at 60° C. The suspension is then filtered and the filter residue washed with hot distilled water and dried at 120° C.

21 g. of the silicic acid prepared in this manner are then ground for 6 hours in a roller mill with 21 g. of ammonium metavanadate, 45 g. of potassium sulfate, 13 g. of ammonium sulfate, 37 g. of naphthalene and 3 g. of stearic acid.

The finely ground pulverulent mixture is pressed to form cylindrical tablets of 5 mm. diameter. Their pressure stability amounts to 6 to 8 kg. The tablets are heated within 8 hours in an air current to 450° C. and then further roasted for one hour at the same temperature.

Example 2

A mixture of 15.8 g. of silicic acid according to Example 1, 12.6 g. of vanadium pentoxide and 35.4 g. of potassium sulfate is ground for 30 minutes in a roller mill. The pulverulent mixture is pasted in a beaker with 4.5 ml. of sulfuric acid of 96.3% strength and 30 ml. of water and then kneaded for 30 minutes.

The resulting viscid paste is pressed into the perforations (5 mm. diameter) of a Teflon plate 5 mm. thick, dried for 30 minutes at 90° C. The granules are pushed out with a glass rod, heated within 7 hours in air to 480° C. and further roasted for one hour at this temperature.

Example 3

A mixture of 28 g. of ammonium vanadate, 60 g. of potassium sulfate and 17.3 g. of ammonium sulfate is ground for 30 minutes in a roller mill, then heated in a porcelain crucible within 3 hours to 575° C., and the resulting melt is maintained for 1 hour at 560 to 580° C.

65 g. of the solidified melt are comminuted and ground for 4 hours in a roller mill with 19.2 g. of silicic acid according to Example 1, 31 g. of naphthalene and 2.5 g. of stearic acid. The pulverulent mixture is then pressed into cylindrical tablets of 5 mm. diameter and 5 mm. height. The tablets are heated within 8 hours in an air current to 450° C. and then further roasted for one hour at this temperature.

Example 4

The same starting materials are used in identical quantities as specified in Example 1. This mixture is likewise pressed into tablets, but these tablets have a pressure stability ranging only from 1 to 1.5 kg. The tablets are then roasted as described in Example 1.

Example 5

A mixture of 21 g. of washed kieselguhr, 10.5 g. of ammonium metavanadate, 45 g. of potassium sulfate, 13 g. of ammonium sulfate, 28 g. of naphthalene and 2 g. of stearic acid is ground for 4 hours in a roller mill and then pressed into tablets of 5 mm. diameter and 5 mm. height. Their pressure stability amounts to 3 to 4 kg. The tablets are roasted as described in Example 1.

Example 6

A mixture of 10.5 g. of silicic acid according to Example 1, 10.5 g. of ammonium metavanadate, 11.1 g. of potassium sulfate, 32.5 g. of thallium sulfate, 6.5 g. of ammonium sulfate, 21 g. of oxalic acid, 9 g. of urea and 3 g. of stearic acid is ground for 4 hours in a roller mill.

The pulverulent mixture is pressed into tablets of 5 mm. diameter and 5 mm. height. The pressure stability is 5–6 kg. The tablets are heated within 8 hours in an air current to 440° C. and then further roasted for one hour at this temperature.

Example 7

A mixture of 6.3 g. of silicic acid according to Example 1, 6.3 g. of ammonium metavanadate, 50 g. of thallium sulfate, 3.9 g. of ammonium sulfate, 21 g. of oxalic acid, 9 g. of urea and 3 g. of stearic acid is ground for 3 hours in a roller mill.

The pulverulent mixture is tabletted and roasted as described in Example 6.

Example 8

A mixture of 21 g. of silicic acid according to Example 1, 14 g. of ammonium metavanadate, 7 g. of ammonium molybdate (corresponding to 43.2% of $MoO_3$ referred to $V_2O_5$), 45 g. of potassium sulfate, 13 g. of ammonium sulfate, 37 g. of naphthalene and 3 g. of stearic acid is ground for 3 hours in a roller mill.

The pulverulent mixture is tabletted as described in Example 6, heated within 7 hours in an air current to 460° C. and then maintained for another hour at this temperature.

15 g. (= approximately 30 ml.) each of the catalysts described in Examples 1 to 8 are heated in a glass reactor to the reaction temperature and tested at various time factors $W/F$ ($W$=weight of catalyst in grams; $F$=supply of naphthalene in g./sec.). The results thus obtained are summarized in the following table:

Example 9

1.65 kg. (=about 3.2 litres) of the catalyst prepared as described in Example 1 are heated in a stainless steel reactor to the reaction temperature of 390° C. and charged with an air current containing 0.61% by volume of naphthalene. The time factor $W/F$ is $50 \cdot 10^3$ seconds.

The gaseous reaction mixture, which contains naphthoquinone, phthalic anhydride and naphthalene, is isolated and resolved into its constituents, to yield the following final products:

Yield in g./100 g. of naphthalene initially used: 46 g. of naphthoquinone and 32 g. of phthalic anhydride.

Yield in g./100 g. of naphthalene converted: 69 g. of naphthoquinone and 48 g. of phthalic anhydride.

What is claimed is:

1. A process for the manufacture of 1,4-naphthoquinone by conducting a mixture of naphthalene and a gas containing free oxygen under atmospheric pressure at a temperature ranging from 300 to 500° C. wherein the gas mixture is conducted over a fixed bed catalyst having pores of which up to 95 percent have a diameter ranging from 0.2 to $50\mu$ and which has been formed by melting the active catalyst mass on its being roasted at a temperature of 250 to 600° C. to constitute an even coating on the inert vehicle, which active catalyst mass consists of 3 to 40 percent by weight of a metal oxide selected from the group consisting of vanadium pentoxide and a mixture of at least 50% of vanadium pentoxide and a metal oxide selected from the group consisting of cesium, aluminum, titanium, zirconium, hafnium, tantalum, niobium, chromium, molybdenum, tungsten, manganese, cobalt, nickel, silver, zinc, mercury or lead, 20 to 60 percent by weight of an alkalimetal sulfate and 20 to 60 percent by weight of an alkalimetal pyrosulfate, and wherein the obtained naphthoquinone is isolated.

2. A process for the manufacture of 1,4-naphthoquinone by conducting a mixture of naphthalene and a gas containing free oxygen under atmospheric pressure at a temperature ranging from 300 to 500° C. wherein the gas mixture is conducted over a fixed bed catalyst having pores of which up to 95 percent have a diameter ranging from 0.2 to $50\mu$ and which has been formed by pressing the active components of the catalyst in pulverized state together with the inert vehicle into mouldings in a manner such that melting of the active catalyst mass occurs on its being roasted at a temperature of 250 to

Table

| Catalyst according to Example— | Pore diameter in $\mu$ [1] | Reaction temperature, °C. | Oxidation gas | Naphthalene charge in percent by volume | Time Factor, $W/F$ | Yield in grams per 100 grams of naphthalene used— | | Yield in grams per 100 grams of naphthalene converted— | |
|---|---|---|---|---|---|---|---|---|---|
| | | | | | | Naphtho-quinone | Phthalic anhydride | Naphtho-quinone | Phthalic anhydride |
| 1 | 1.5 to 8 | 380 | Air | 1.1 | $11 \cdot 10^3$ | 25 | 14 | 74 | 43 |
| 1 | 1.5 to 8 | 380 | Air | 1.1 | $19 \cdot 10^3$ | 37 | 25 | 70 | 48 |
| 1 | 1.5 to 8 | 380 | Air | 1.1 | $42 \cdot 10^3$ | 49 | 45 | 62 | 56 |
| 1 | 1.5 to 8 | 410 | Air | 1.1 | $11 \cdot 10^3$ | 31 | 21 | 69 | 46 |
| 1 | 1.5 to 8 | 410 | Air | 1.1 | $21 \cdot 10^3$ | 43 | 34 | 64 | 50 |
| 1 | 1.5 to 8 | 350 | Air | 1.1 | $30 \cdot 10^3$ | 31 | 22 | 68 | 49 |
| 1 | 3 to 8 | 380 | Air | 0.35 | $80 \cdot 10^3$ | 52 | 44 | 63 | 54 |
| 1 | 3 to 8 | 380 | Air | 7.9 | $10 \cdot 10^3$ | 25 | 22 | 64 | 56 |
| 1 | 3 to 8 | 380 | 8% $O_2$, 92% $N_2$ | 1.1 | $35 \cdot 10^3$ | 29 | 23 | 67 | 52 |
| 1 | 3 to 8 | 380 | 50% $O_2$, 50% $N_2$ | 1.1 | $35 \cdot 10^3$ | 52 | 45 | 64 | 55 |
| 2 | 0.5 to 20 | 380 | Air | 1.1 | $17 \cdot 10^3$ | 31 | 22 | 69 | 49 |
| 2 | 0.5 to 20 | 380 | Air | 1.1 | $46 \cdot 10^3$ | 43 | 45 | 58 | 60 |
| 3 | 2 to 7 | 380 | Air | 1.1 | $16 \cdot 10^3$ | 25 | 16 | 72 | 45 |
| 3 | 2 to 7 | 380 | Air | 1.1 | $29 \cdot 10^3$ | 37 | 27 | 69 | 49 |
| 3 | 2 to 7 | 380 | Air | 1.1 | $57 \cdot 10^3$ | 49 | 43 | 63 | 55 |
| 4 | 0.02–20 | 380 | Air | 1.1 | $21 \cdot 10^3$ | 14 | 72 | 12 | 98 |
| 4 | 0.02–20 | 380 | Air | 1.1 | $35 \cdot 10^3$ | 12 | 91 | 18 | 93 |
| 5 | 3 to 15 | 380 | Air | 1.1 | $21 \cdot 10^3$ | 25 | 15 | 73 | 44 |
| 5 | 3 to 15 | 380 | Air | 1.1 | $35 \cdot 10^3$ | 37 | 27 | 69 | 49 |
| 5 | 3 to 15 | 380 | Air | 1.1 | $61 \cdot 10^3$ | 49 | 44 | 63 | 56 |
| 6 | 1.0 to 15 | 380 | Air | 1.1 | $19 \cdot 10^3$ | 31 | 22 | 68 | 49 |
| 6 | 1.0 to 15 | 380 | Air | 1.1 | $34 \cdot 10^3$ | 43 | 33 | 67 | 51 |
| 8 | 2 to 20 | 380 | Air | 1.1 | $28 \cdot 10^3$ | 31 | 22 | 69 | 49 |
| 8 | 2 to 20 | 380 | Air | 1.1 | $38 \cdot 10^3$ | 37 | 30 | 65 | 53 |

[1] 95% of the pore volume has a diameter within the indicated range.

600° C. to constitute an even coating on the inert vehicle, said active catalyst mass consisting of 3 to 40 percent by weight of a metal oxide selected from the group consisting of vanadium pentoxide and a mixture of at least 50% of vanadium pentoxide and a metal oxide selected from the group consisting of cesium, aluminum, titanium, zirconium, hafnium, tantalum, niobium, chromium, molybdenum, tungsten, manganese, cobalt, nickel, silver, zinc, mercury or lead, 20 to 60 percent by weight of an alkalimetal sulfate and 20 to 60 percent by weight of an alkalimetal pyrosulfate, and wherein the obtained naphthoquinone is isolated.

3. A process for the manufacture of 1,4-naphthoquinone by conducting a mixture of naphthalene and a gas containing free oxygen under atmospheric pressure at a temperature ranging from 300 to 500° C. wherein the gas mixture is conducted over a fixed bed catalyst having pores of which up to 95 percent have a diameter ranging from 0.2 to 50μ and which has been formed by melting the active components of the catalyst in pulverized state, cooling and pulverizing said melt and mixing it with the inert vehicle, forming the mixture into mouldings and melting the active catalyst mass on its being roasted at a temperature of 250 to 600° C. to constitute an even coating on the inert vehicle, said active catalyst mass consisting of 3 to 40 percent by weight of a metal oxide selected from the group consisting of vanadium pentoxide and a mixture of at least 50% of vanadium pentoxide and a metal oxide selected from the group consisting of cesium, aluminum, titanium, zirconium, hafnium, tantalum, niobium, chromium, molybdenum, tungsten, manganese, cobalt, nickel, silver, zinc, mercury or lead, 20 to 60 percent by weight of an alkalimetal sulfate and 20 to 60 percent by weight of an alkalimetal pyrosulfate, and wherein the obtained naphthoquinone is isolated.

4. A process for the manufacture of 1,4-naphthoquinone by conducting a mixture of naphthalene and a gas containing free oxygen under atmospheric pressure at a temperature ranging from 300 to 500° C. wherein the gas mixture is conducted over a fixed bed catalyst having pores of which up to 95 percent have a diameter ranging from 0.2 to 50μ and which has been formed by pasting the active components of the catalyst in pulverized state together with the inert vehicle, pressing the pasty mixture into mouldings and melting the active catalyst mass on its being roasted at a temperature of 250 to 600° C. to constitute an even coating on the inert vehicle, said active catalyst mass consisting of 3 to 40 percent by weight of a metal oxide selected from the group consisting of vanadium pentoxide and a mixture of at least 50% of vanadium pentoxide and a metal oxide selected from the group consisting of cesium, aluminum, titanium, zirconium, hafnium, tantalum, niobium, chromium, molybdenum, tungsten, manganese, cobalt, nickel, silver, zinc, mercury or lead, 20 to 60 percent by weight of an alkalimetal sulfate and 20 to 60 percent by weight of an alkalimetal pyrosulfate, and wherein the obtained naphthoquinone is isolated.

5. In an improved process for preferentially manufacturing 1,4-naphthoquinone, the improvement which comprises conducting a mixture of naphthalene and a gas containing free oxygen under atmospheric pressure at a temperature ranging from 300–500° C. over a solid bed catalyst consisting of an active catalyst mass and having an inert support and having pores of which about 95% have a diameter ranging from 0.2–50μ, said active catalyst mass being obtained by roasting together at 250–600° C. a mixture of catalyst components consisting of 3–40 percent by weight of a metal oxide selected from the group consisting of vanadium pentoxide and a mixture of at least 50% vanadium pentoxide and an oxide of a metal selected from the group consisting of cesium, aluminum, titanium, zirconium, hafnium, tantalum, niobium, chromium, molybdenum, tungsten, manganese, cobalt, nickel, silver, zinc, mercury or lead, 20 to 60% by weight of an alkalimetal sulfate and 20 to 60% by weight of an alkalimetal pyrosulfate, the catalyst mass forming an even coating on the inert support; and thereafter isolating the 1,4-naphthoquinone obtained.

6. The process according to claim 5 wherein the catalyst components and inert support are pressed together into a moulding and thereafter roasted, the active catalyst mass thus obtained forming an even coating on the inert support.

7. The process according to claim 5 wherein the catalyst components are roasted to provide the active catalyst mass which is thereafter cooled, pulverized and mixed with the inert support and again roasted to provide an even coating of the active catalyst mass on the inert support.

8. The process according to claim 5 wherein the catalyst components are roasted to form the catalyst mass, which is pulverized, pasted together with the inert support, pressed into mouldings and then roasted to provide an even coating of the catalyst mass on the inert support.

References Cited

UNITED STATES PATENTS 3,012,043 12/1961 Dowden et al. _____ 260—396
3,167,567 1/1965 Nonnenmacher et al. __ 252—440

LORRAINE A. WEINBERGER, *Primary Examiner.*

L. A. THAXTON, *Assistant Examiner.*